United States Patent
Tao et al.

(10) Patent No.: US 11,244,119 B1
(45) Date of Patent: Feb. 8, 2022

(54) MULTI-MODAL LIE DETECTION METHOD AND APPARATUS, AND DEVICE

(71) Applicant: Institute of Automation, Chinese Academy of Sciences, Beijing (CN)

(72) Inventors: Jianhua Tao, Beijing (CN); Licai Sun, Beijing (CN); Bin Liu, Beijing (CN); Zheng Lian, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/389,383

(22) Filed: Jul. 30, 2021

(30) Foreign Application Priority Data

Jan. 4, 2021 (CN) .......................... 202110001041.2

(51) Int. Cl.
| | |
|---|---|
| *G06F 40/35* | (2020.01) |
| *G10L 15/08* | (2006.01) |
| *G10L 15/02* | (2006.01) |
| *G10L 15/24* | (2013.01) |
| *G06N 3/04* | (2006.01) |
| *G06K 9/62* | (2006.01) |
| *G06K 9/00* | (2006.01) |

(52) U.S. Cl.
CPC ......... *G06F 40/35* (2020.01); *G06K 9/00718* (2013.01); *G06K 9/00744* (2013.01); *G06K 9/629* (2013.01); *G06K 9/6217* (2013.01); *G06N 3/04* (2013.01); *G10L 15/02* (2013.01); *G10L 15/083* (2013.01); *G10L 15/24* (2013.01)

(58) Field of Classification Search
CPC ........ G06N 20/00; G06N 3/0454; G06N 5/04; G06N 3/02; A61B 5/164
See application file for complete search history.

(56) References Cited

U.S. PATENT DOCUMENTS

| | | | |
|---|---|---|---|
| 11,074,500 B2 * | 7/2021 | Volkova | .................. G06F 40/30 |
| 2004/0143170 A1 * | 7/2004 | DuRousseau | ............ A61B 5/16 600/300 |
| 2017/0119296 A1 * | 5/2017 | Macknik | ................ A61B 3/113 |

(Continued)

OTHER PUBLICATIONS

Feng, Kai Jiabo. "DeepLie: Detect Lies with Facial Expression (Computer Vision)."*

(Continued)

*Primary Examiner* — Matthew H Baker
(74) *Attorney, Agent, or Firm* — Bayramoglu Law Offices LLC

(57) ABSTRACT

A multi-modal lie detection method and apparatus, and a device to improve an accuracy of an automatic lie detection are provided. The multi-modal lie detection method includes inputting original data of three modalities, namely a to-be-detected audio, a to-be-detected video and a to-be-detected text; performing a feature extraction on input contents to obtain deep features of the three modalities; explicitly depicting first-order, second-order and third-order interactive relationships of the deep features of the three modalities to obtain an integrated multi-modal feature of each word; performing a context modeling on the integrated multi-modal feature of the each word to obtain a final feature of the each word; and pooling the final feature of the each word to obtain global features, and then obtaining a lie classification result by a fully-connected layer.

8 Claims, 2 Drawing Sheets

(56) References Cited

U.S. PATENT DOCUMENTS

2019/0038200 A1\* 2/2019 Lee .................. A61B 5/02
2020/0060598 A1\* 2/2020 Palti-Wasserman ................
      A61B 5/0533
2021/0074305 A1\* 3/2021 Gopala ............ G06N 3/0472

OTHER PUBLICATIONS

Venkatesh, Sushma, Raghavendra Ramachandra, and Patrick Bours. "Robust algorithm for multimodal deception detection." 2019 IEEE Conference on Multimedia Information Processing and Retrieval (MIPR). IEEE, 2019.\*

Krishnamurthy, Gangeshwar, et al. "A deep learning approach for multimodal deception detection." arXiv preprint arXiv:1803.00344 (2018).\*

Kopev, Daniel, et al. "Detecting deception in political debates using acoustic and textual features." 2019 IEEE Automatic Speech Recognition and Understanding Workshop (ASRU). IEEE, 2019.\*

\* cited by examiner

MULTI-MODAL LIE DETECTION METHOD AND APPARATUS, AND DEVICE

CROSS REFERENCE TO THE RELATED APPLICATIONS

This application is based upon and claims priority to Chinese Patent Application No. 202110001041.2 filed on Jan. 4, 2021, the entire contents of which are incorporated herein by reference.

TECHNICAL FIELD

The embodiments of the application relate to the technical field of data processing, in particular to a multi-modal lie detection method and apparatus, and a device.

BACKGROUND

Traditional lie detection techniques detect lies by means of contact-type physiological signals such as skin electric signals, ECG signals and EGG signals. However, such lie detection methods are often limited by the degree of coordination of testees, and thus cannot detect lies very accurately. With the development of computer science and technology, non-contact lie detection methods based on audios and videos have emerged and will be widely applied in the fields of education and finance in the future. Existing non-contact lie detection methods extract features of different modalities by a deep neural network, integrate the features of the different modalities by stitching, and perform context modeling by a recurrent neural network to obtain a lie detect result eventually.

The existing techniques have the following defects: the extracted features of the modalities are simply stitched, and high-order interactive relationships between different modalities is neglected, so that the lie detection effect is unsatisfying; in addition, the long-term modeling effect of the recurrent neural network is poor, which also makes the lie detection effect unsatisfying.

SUMMARY

The embodiments of the application provide a multi-modal lie detection method and apparatus, and a device to improve the accuracy of automatic lie detection.

In a first aspect, the embodiments of the application provide a multi-modal lie detection method based on recurrent neural networks and a self-attention mechanism, the method comprises:

inputting a to-be-detected audio, a to-be-detected video and a to-be-detected text, wherein the to-be-detected audio, the to-be-detected video and the to-be-detected text are three different modalities;

performing feature extraction on the to-be-detected audio, the to-be-detected video and the to-be-detected text to obtain word-level deep audio features, word-level deep video features and word-level deep text features;

explicitly depicting first-order, second-order and third-order interactive relationships of the word-level deep audio features, the word-level deep video features and the word-level deep text features to obtain an integrated multi-modal feature of each word;

performing context modeling on the integrated multi-modal feature of each word to obtain a final feature of each word; and obtaining a lie classification result according to the final feature of each word.

Optionally, performing feature extraction on the to-be-detected audio, the to-be-detected video and the to-be-detected text to obtain word-level deep audio features, word-level deep video features and word-level deep text features comprises:

acquiring, by a text alignment tool, alignment information of each word in the to-be-detected audio, the to-be-detected video and the to-be-detected text;

extracting the word-level deep audio features from the to-be-detected audio by a pre-trained audio feature extraction network according to the alignment information;

extracting the word-level deep video features from the to-be-detected video by a pre-trained video feature extraction network according to the alignment information; and inputting the to-be-detected text to a pre-trained text feature extraction network to extract the word-level deep text features from the to-be-detected text.

Optionally, extracting the word-level deep audio features from the to-be-detected audio by a pre-trained audio feature extraction network according to the alignment information comprises:

extracting an audio clip, corresponding to each word, from the to-be-detected audio according to the alignment information; and inputting the audio clip to the pre-trained audio feature extraction network to obtain the word-level deep audio features.

Optionally, extracting the word-level deep video features from the to-be-detected video by a pre-trained video feature extraction network according to the alignment information comprises:

extracting a video clip, corresponding to each word, from the to-be-detected video according to the alignment information;

extracting multiple frames of images from the video clip;

performing down-sampling on the multiple frames of images to obtain multiple down-sampled images;

inputting the multiple down-sampled images to a trained image feature extraction network to extract high-level features from the multiple down-sampled images; and pooling the high-level features to obtain pooled features, and taking the pooled features as the word-level deep video features of the video clip.

Optionally, explicitly depicting first-order, second-order and third-order interactive relationships of the word-level deep audio features, the word-level deep video features and the word-level deep text features to obtain an integrated multi-modal feature of each word comprises:

performing linear transformation on the word-level deep audio features, the word-level deep video features and the word-level deep text features respectively to uniformize dimensions of the features of the different modalities to obtain uniformized word-level deep audio features, word-level deep video features and word-level deep text features;

adding an element, the value of which is 1, to the uniformized word-level deep audio features, word-level deep video features and word-level deep text features respectively to obtain word-level audio features, word-level video features and word-level text features added with the element; and calculating a tensor product of the word-level audio features, word-level video features and word-level text features added with the element to obtain the integrated multi-modal feature of each word.

Optionally, performing context modeling on the integrated multi-modal feature of each word to obtain a final feature of each word comprises:

calculating, by a self-attention mechanism, the integrated multi-modal feature of each word to obtain a multi-modal feature fused with the self-attention mechanism;

inputting the multi-modal feature fused with the self-attention mechanism to a forward LSTM network and a backward LSTM network respectively to obtain a hidden-layer feature output by the forward LSTM network and a hidden-layer feature output by the backward LSTM network; and stitching the hidden-layer feature output by the forward LSTM network and the hidden-layer feature output by the backward LSTM network to obtain the final feature of each word.

Optionally, calculating, by a self-attention mechanism, the integrated multi-modal feature of each word to obtain a multi-modal feature fused with the self-attention mechanism comprises:

figuring out an attention weight and an attention value term of each word according to the integrated multi-modal feature of each word; and obtaining the multi-modal feature fused with the self-attention mechanism by calculation according to the attention weight and the attention value term of each word.

Optionally, obtaining a lie classification result according to the final feature of each word comprises:

inputting the final feature of each word to a pooling layer, and obtaining global features by max-pooling; and inputting the global features to a fully-connected network, and outputting the lie classification result by the fully-connected network.

In a second aspect, the embodiments of the application provide a multi-modal lie detection apparatus, the apparatus comprises:

a to-be-detected clip input module used for inputting a to-be-detected audio, a to-be-detected video and a to-be-detected text, wherein the to-be-detected audio, the to-be-detected video and the to-be-detected text are three different modalities;

a short-term feature extraction module used for performing feature extraction on the to-be-detected audio, the to-be-detected video and the to-be-detected text to obtain word-level deep audio features, word-level deep video features and word-level deep text features;

a multi-modal feature integration module used for explicitly depicting first-order, second-order and third-order interactive relationships of the word-level deep audio features, the word-level deep video features and the word-level deep text features to obtain an integrated multi-modal feature of each word;

a temporal context modeling module used for performing context modeling on the integrated multi-modal feature of each word to obtain a final feature of each word; and a lie classification module used for obtaining a lie classification result according to the final feature of each word.

Optionally, the short-term feature extraction module comprises:

a text alignment sub-module used for acquiring alignment information of each word in the to-be-detected audio, the to-be-detected video and the to-be-detected text by a text alignment tool;

an audio feature extraction sub-module used for extracting the word-level deep audio features from the to-be-detected audio by a pre-trained audio feature extraction network according to the alignment information;

a video feature extraction sub-module used for extracting the word-level deep video features from the to-be-detected video by a pre-trained video feature extraction network according to the alignment information; and a text feature extraction sub-module used for inputting the to-be-detected text to a pre-trained text feature extraction network to extract the word-level deep text features from the to-be-detected text.

Optionally, the audio feature extraction sub-module comprises:

an audio clip extraction sub-module used for extracting an audio clip, corresponding to each word, from the to-be-detected audio according to the alignment information; and a deep audio feature extraction sub-module used for inputting the audio clip to the pre-trained audio feature extraction network to obtain the word-level deep audio features.

Optionally, video feature extraction sub-module comprises:

a video clip extraction sub-module used for extracting a video clip, corresponding to each word, from the to-be-detected video according to the alignment information;

an image extraction sub-module used for extracting multiple frames of images from the video clip;

an image down-sampling sub-module used for performing down-sampling on the multiple frames of images to obtain multiple down-sampled images;

a high-level feature extraction sub-module used for inputting the multiple down-sampled images to a trained image feature extraction network to extract high-level features from the multiple down-sampled images; and a deep video feature extraction sub-module used for pooling the high-level features to obtain pooled features, and taking the pooled features as the word-level deep video features of the video clip.

Optionally, multi-modal feature integration module comprises:

a deep feature uniformizing sub-module used for performing linear transformation on the word-level deep audio features, the word-level deep video features and the word-level deep text features respectively to uniformize dimensions of the features of the different modalities to obtain uniformized word-level audio features, word-level video features and word-level text features;

an element adding sub-module used for adding an element, the value of which is 1, to the uniformized word-level audio features, word-level video features and word-level text features respectively to obtain word-level audio features, word-level video features and word-level text features added with the element; and a multi-modal feature integration sub-module used for calculating a tensor product of the word-level audio features, word-level video features and word-level text features added with the element to obtain the integrated multi-modal feature of each word.

Optionally, the temporal context modeling module comprises:

a self-attention mechanism fusion sub-module used for calculating, by a self-attention mechanism, the integrated multi-modal feature of each word to obtain a multi-modal feature fused with the self-attention mechanism;

a hidden-layer feature extraction sub-module used for inputting the multi-modal feature fused with the self-attention mechanism to a forward LSTM network and a backward LSTM network respectively to obtain a hidden-layer feature output by the forward LSTM network and a hidden-layer feature output by the backward LSTM network; and a final feature stitching sub-module used for stitching the hidden-layer feature output by the forward LSTM network and the hidden-layer feature output by the backward LSTM network to obtain the final feature of each word.

Optionally, the self-attention mechanism fusion sub-module comprises:

a parameter calculation sub-module used for figuring out an attention weight and an attention value term of each word according to the integrated multi-modal feature of each word; and an attention mechanism calculation sub-module used for obtaining the multi-modal feature fused with the self-attention mechanism by calculation according to the attention weight and the attention value term of each word.

Optionally, the lie classification module comprises:

a pooling sub-module used for inputting the final feature of each word to a pooling layer to obtain global features by max-pooling; and a lie classification sub-module used for inputting the global features to a fully-connected network and outputting the lie classification result by the fully-connected network.

In a third aspect, the embodiments of the application provide an electronic device, comprising a memory, a processor, and a computer program stored in the memory and capable of running on the processor, wherein when the processor executes the computer program, the steps of the method according to the first aspect of the application are performed.

By adoption of the multi-modal lie detection method based on recurrent neural networks and a self-attention mechanism of the application, alignment information of each word in the input to-be-detected audio, to-be-detected video and to-be-detected text is obtained by an alignment tool, and deep audio features of the to-be-detected audio are extracted by a pre-trained audio feature extraction network according to the alignment information of each word; deep video features of the to-be-detected video are extracted by a pre-trained video feature extraction network according to the alignment information of each word; deep text features are extracted by a pre-trained text feature extraction network, and the deep audio features, the deep video features and the deep text features are integrated by a tensor fusion strategy to obtain an integrated multi-modal feature of each word, the integrated multi-modal feature of each word is calculated by a self-attention mechanism to obtain a multi-modal feature fused with the self-attention mechanism, and the multi-modal feature fused with the self-attention mechanism are input to bidirectional recurrent neural networks to capture a long-term dependence in a language to obtain a final feature of each word; and global features are obtained by max-pooling, and a lie classification result is output by a fully-connected network. According to the invention, first-order and high-order interactive relationships of the multi-modal features are explicitly depicted by the tensor fusion strategy, and modeling is explicitly performed on the first-order and high-order interactive relationships of feature representations of the three modalities, namely the audio, video and text, so that multi-modal information is fully integrated; the context relationship of any two words can be effectively captured by means of the bidirectional LSTM (long short-term memory) recurrent neural networks and the self-attention mechanism, temporal context modeling is effectively completed, the independence of the bidirectional networks during temporal modeling is avoided, and the accuracy of lie detection is improved.

BRIEF DESCRIPTION OF THE DRAWINGS

To more clearly explain the technical solutions of the embodiments of the application, drawings used for describing the embodiments of the application will be briefly introduced below. Obviously, the drawings in the following description merely illustrate some embodiments of the application, and those ordinarily skilled in the art may obtain other drawings according to the following ones without creative labor.

DETAILED DESCRIPTION OF THE EMBODIMENTS

The technical solutions of the embodiments of the application will be clearly and comprehensively described below in conjunction with the accompanying drawings of the embodiments. Obviously, the embodiments in the following description are merely illustrative ones, and are not all possible ones of the application. All other embodiments obtained by those ordinarily skilled in the art based on the following ones without creative labor should also fall within the protection scope of the application.

In the embodiments of the invention, a pre-trained network is used to extract word-level deep feature representations, which, compared with traditional manually extracted features, are more efficient and do not need specific expert knowledge in the field; modeling is explicitly performed on first-order and higher-order interactive relationships of feature representations of three modalities, namely an audio, a video and a text, by a tensor fusion method to fully integrate multi-modal information; and recurrent neural networks and a self-attention mechanism are organically combined to capture a long-term dependence in a language, so that the independence of the two networks during temporal modeling is avoided, thus improving the accuracy of lie detection.

Figure 1:
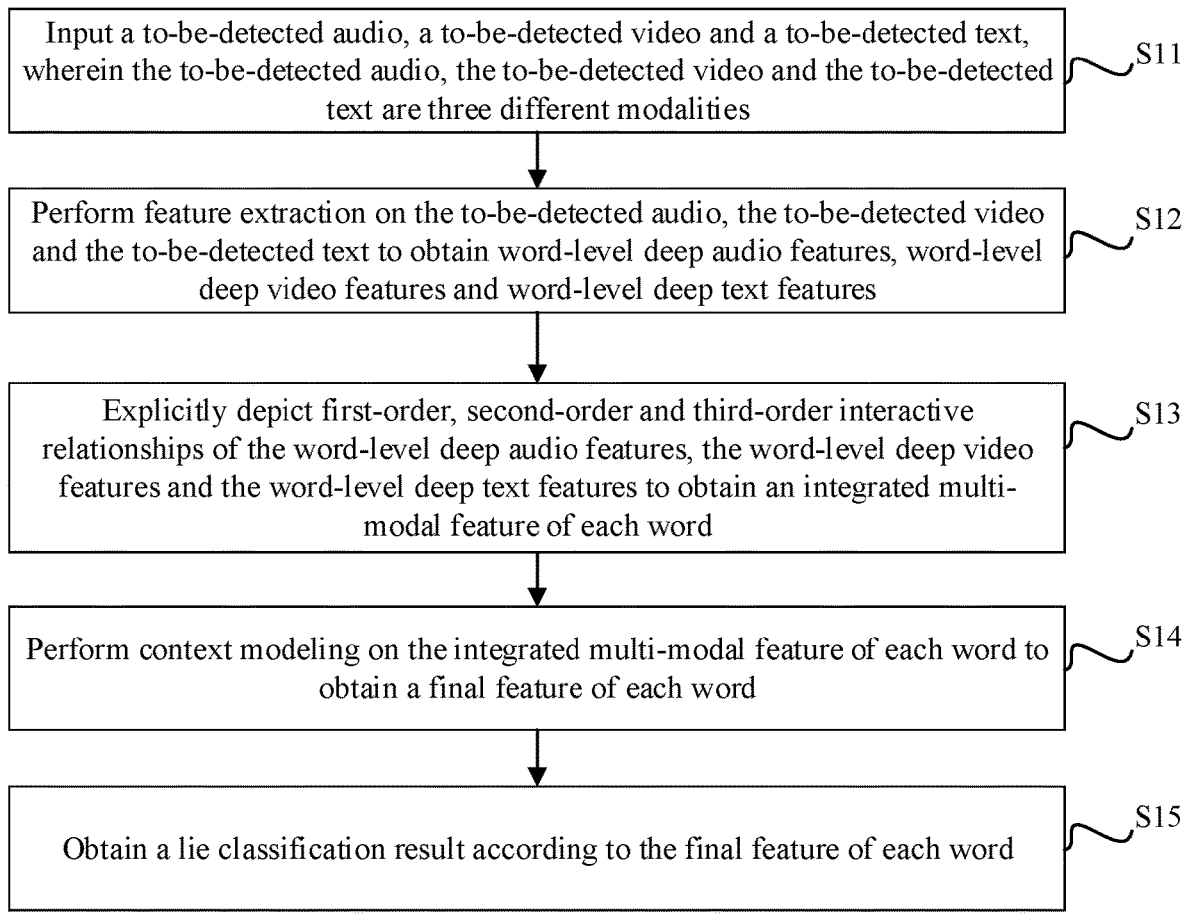
FIG. 1 is a flow diagram of a multi-modal lie detection method provided by one embodiment of the application.

Refer to FIG. 1 which is a flow diagram of a multi-modal lie detection method based on recurrent neural networks and a self-attention mechanism according to one embodiment of the application. As shown in FIG. 1, the method comprises the following steps:

S11: inputting a to-be-detected audio, a to-be-detected video and a to-be-detected text, wherein the to-be-detected audio, the to-be-detected video and the to-be-detected text are three different modalities.

In this embodiment, the to-be-detected audio and the to-be-detected video are an audio and a video in the same clip, the to-be-detected text corresponds to the to-be-detected audio and the to-be-detected video, and the audio, the video and the text are three modalities in the clip.

In this embodiment, data of these three modalities is analyzed to detect whether what a character in the clip says is true.

Illustratively, a clip, in which one or more characters speak, is input, continuous images of the one or more characters speaking in the clip is the to-be-detected video, an audio in the clip is the to-be-detected audio, and a text corresponding to the video and the audio in the clip is the to-be-detected text. For example, one character speaks in the clip, images of the character speaking in the clip is the to-be-detected video, speeches spoken by the character are the to-be-detected audio, and verbal contents spoken by the person are the to-be-detected text.

S12: performing feature extraction on the to-be-detected audio, the to-be-detected video and the to-be-detected text to obtain word-level deep audio features, word-level deep video features and word-level deep text features.

In this embodiment, performing feature extraction on the to-be-detected audio, the to-be-detected video and the to-be-detected text refers to transforming the to-be-detected audio, the to-be-detected video and the to-be-detected text into feature vectors input to a neural network, and "word-level" refers to extracting a deep audio feature, a deep video feature and a deep text feature corresponding to each word in the input clip.

In this embodiment, performing feature extraction on the to-be-detected audio, the to-be-detected video and the to-be-detected text to obtain word-level deep audio features, word-level deep video features and word-level deep text features comprises the following specific steps:

S12-1: acquiring, by a text alignment tool, alignment information of each word in the to-be-detected audio, the to-be-detected video and the to-be-detected text.

In this embodiment, text alignment refers to enabling contents in the to-be-detected text to be in one-to-one correspondence with contents in the to-be-detected audio and the to-be-detected video. In the invention, to-be-detected contents are processed in words, so each word in the to-be-detected text needs to be aligned with the to-be-detected audio and the to-be-detected video, and a text including one word corresponds to an audio of the word and a video of a person speaking the word.

In this embodiment, the to-be-tested audio and the to-be-detected video are aligned with the to-be-tested text by determining a start time and an end time, in the audio and the video in the input clip, of each word in the to-be-detected text.

Illustratively, alignment information $[b_t, e_t]$ of each word $w_t$ in each to-be-detected audio, each to-be-detected video and each to-be-detected text may be obtained by the alignment tool, wherein $b_t$ represents the start time of each word $w_t$ in the input clip, and $e_t$ represents the end time of each word $w_t$ in the input clip. By means of the text alignment tool, the start times of the words $w_t$ in the input audio, video and the text correspond to one another. The alignment tool may be a common alignment tool, and this embodiment has no limitation in this aspect.

S12-2: extracting the word-level deep audio features from the to-be-detected audio by a pre-trained audio feature extraction network according to the alignment information.

In this embodiment, extracting the word-level deep audio features from the to-be-detected audio by a pre-trained audio feature extraction network according to the alignment information comprises the following specific steps:

S12-2-1: extracting an audio clip, corresponding to each word, from the to-be-detected audio according to the alignment information.

In this embodiment, the alignment information includes the start time and the end time of each word in the to-be-detected audio, and the audio clip, corresponding to each word, is extracted from the to-be-detected audio according to the start time and the end time of each word in the alignment information.

Illustratively, a corresponding audio clip $s_t^a$ is extracted from the to-be-detected audio according to the alignment information $[b_t, e_t]$ of each word $w_t$ in the input clip. For example, if the alignment information of a word "hello" in the to-be-detected text indicates that the start time and the end time of the word "hello" are "00:16" and "00:17" respectively, an audio clip, from the 16th second to the 17th second, in the to-be-detected audio may be extracted to be used as an audio clip corresponding to the word "hello".

S12-2-2: inputting the audio clip to the pre-trained audio feature extraction network to obtain the word-level deep audio features.

In this embodiment, the pre-trained audio feature extraction network is used to extract audio features, and the audio clip corresponding to each word is input to the pre-trained audio feature extraction network to obtain the deep audio feature of each word.

In this embodiment, the audio feature extraction network is able to transform the input audio clip $s_t^a$ into a feature vector, and the feature vector is the deep audio feature $x_t^a$ corresponding to the word $w_t$. The audio feature extraction network is a common feature extraction network such as VGGish, and this embodiment has no limitation in this aspect.

S12-3: extracting the word-level deep video features from the to-be-detected video by a pre-trained video feature extraction network according to the alignment information.

In this embodiment, extracting the word-level deep video features from the to-be-detected video by a pre-trained video feature extraction network according to the alignment information comprises the following specific steps:

S12-3-1: extracting a video clip, corresponding to each word, from the to-be-detected video according to the alignment information.

In this embodiment, a method for extracting a video clip $s_t^v$ corresponding to each word according to the alignment information $[b_t, e_t]$ of each word $w_t$ is the same as the method for extracting the audio clip corresponding to each word according to the alignment information of each word, and will no longer be detailed here.

S12-3-2: extracting multiple frames of images from the video clip.

In this embodiment, each video clip comprises multiple frames of images, and these images are extracted frame by frame to be processed subsequently.

Illustratively, assume the frame rate of the to-be-detected video is 30 frames per second and the video clip, corresponding to the word "hello", extracted in S11-3-1 lasts for 1 second, 30 frames of images within 1 second are all extracted.

S12-3-3: performing down-sampling on the multiple frames of images to obtain multiple down-sampled images.

In this embodiment, the number of sampling points is reduced by down-sampling, such that the images can be zoomed down to a preset size to generate thumbnails corresponding to the images to facilitate subsequent processing.

Illustratively, 500*500 images may be uniformly down-sampled to 128*128 images.

S12-3-4: inputting the multiple down-sampled images to a trained image feature extraction network to extract high-level features from the multiple down-sampled images.

In this embodiment, image features of the images may be extracted by inputting the down-sampled images to the pre-trained image feature extraction network, and the image feature extraction network performs convolutional computation on the images multiple times and extracts abstract features of the images every time of convolutional computation, such that the images are transformed into feature vectors, and the feature vectors are high-level features of the images.

S12-3-5: pooling the high-level features to obtain pooled features, and taking the pooled features as the word-level deep video features of the video clip.

In this embodiment, all the images are input a pooling layer of the feature extraction network, and the high-level features of the images are further processed by the pooling layer to reduce unnecessary parameters, such that the calculation amount is reduced, and major features of the images are reserved; and the pooled feature vectors are deep video features $x_t^v$ of the video clip $s_t^v$.

In this embodiment, the video feature extraction network may be a network for extracting video features such as VGG or ResNet, and this embodiment has no limitation in this aspect.

S12-4: inputting the to-be-detected text to a pre-trained text feature extraction network to extract the word-level deep text features from the to-be-detected text.

In this embodiment, after receiving the to-be-detected text, the pre-trained text feature extraction network extracts the deep text feature of each word in the to-be-detected text.

Illustratively, the to-be-detected text is input to the pre-trained text feature extraction network, then the text feature extraction network extracts word embedding of each word $w_t$ in the to-be-detected text, namely the word vector of each word $w_t$, and the word vector is a deep text feature $x_t^l$ corresponding to each word $w_t$. The text feature extraction network may be a common network for semantic recognition such as word2vec, and this embodiment has no limitation in this aspect.

S13: explicitly depicting first-order, second-order and third-order interactive relationships of the word-level deep audio features, the word-level deep video features and the word-level deep text features to obtain an integrated multi-modal feature of each word.

In this embodiment, to better analyze whether what the character in the input clip says is true, the first-order, second-order and third-order interactive relationships of the word-level deep audio features, the word-level deep video features and the word-level deep text features need to be explicitly depicted to obtain the integrated multi-modal feature of each word, and the integrated multi-modal feature of each word integrates interactive information of the three modalities, thus being able to more accurately analyze whether what the character in the input clip says is true and improving the accuracy of lie detection.

In this embodiment, explicitly depicting first-order, second-order and third-order interactive relationships of the word-level deep audio features, the word-level deep video features and the word-level deep text features to obtain an integrated multi-modal feature of each word comprise the following specific steps:

S13-1: performing linear transformation on the word-level deep audio features, the word-level deep video features and the word-level deep text features respectively to uniformize dimensions of the features of the different modalities to obtain uniformized word-level audio features, word-level video features and word-level text features;

In this embodiment, to integrate the features of the three modalities, the deep audio features, the deep video features and the deep text features need to be linearly transformed to uniformize the dimensions of the features of the three modalities as follows:

$$x_t^{a'} = W_a x_t^a$$

$$x_t^{v'} = W_v x_t^v$$

$$x_t^{l'} = W_l x_t^l$$

Wherein, $x_t^a$ is the word-level deep audio features, $x_t^v$ is the word-level deep video features, $x_t^l$ is the word-level deep text features, $W_a$ is a linear variation parameter of the deep audio features, $W_v$ is a linear variation parameter of the deep video features, and $W_l$ is a linear variation parameter of the deep text features. Uniformized word-level audio features $x_t^{a'}$, uniformized word-level deep video features $x_t^{v'}$ and uniformized word-level deep text features $x_t^{l'}$ are obtained by calculation.

S13-2: adding an element, the value of which is 1, to the uniformized word-level deep audio features, word-level deep video features and word-level deep text features respectively to obtain word-level audio features, word-level video features and word-level text features added with the element.

In this embodiment, to reserve first-order and second-order properties of the integrated multi-modal features, the element, the value of which is 1, needs to be added to the uniformized word-level audio features, word-level video features and word-level text features respectively to ensure explicit modeling of the first-order and second-order relationships of different modalities in the subsequent calculation, which is specifically implemented as follows:

$$x_t^{a''} = [x_t^{a'}, 1]$$

$$x_t^{v''} = [x_t^{v'}, 1]$$

$$x_t^{l''} = [x_t^{l'}, 1]$$

Wherein, $x_t^{a''}$ is the word-level audio features added with the element, $x_t^{v''}$ is the word-level video features added with the element, and $x_t^{l''}$ is the word-level text features added with the element.

S13-3: calculating a tensor product of the word-level audio features, word-level video features and word-level text features added with the element to obtain the integrated multi-modal feature of each word.

In this embodiment, tensors of the word-level audio features, word-level video features and word-level text features added with the element are multiplied to obtain the integrated multi-modal feature of each word, and the tensor product is calculated as follows:

$$x_t = x_t^{a''} \otimes x_t^{v''} \otimes x_t^{l''}$$

Wherein, $x_t$ is the integrated multi-modal feature of each word, and $\otimes$ is a calculation symbol of the tensor product.

In this embodiment, the tensors of the features of the three modalities are calculated to explicitly depict the third-order relationships of different modalities, and the element 1 is added to each feature in S13-2, so the first-order and second-order relationships of different modalities are reserved during tensor calculation.

S14: performing context modeling on the integrated multi-modal feature of each word to obtain a final feature of each word.

In this embodiment, after the integrated multi-modal feature of each word is obtained in S13, it is necessary to obtain the final feature of each word with reference to the context.

In this embodiment, performing context modeling on the integrated multi-modal feature of each word to obtain a final feature of each word comprises the following specific steps:

S14-1: calculating, by a self-attention mechanism, the integrated multi-modal feature of each word to obtain a multi-modal feature fused with the self-attention mechanism.

In this embodiment, the weight of the integrated multi-modal feature of each word may be figured out by the self-attention mechanism, and emphases are placed on words with high weights during feature analysis, such that the accuracy of lie detection is improved. Calculating, by a self-attention mechanism, the integrated multi-modal feature of each word to obtain a multi-modal feature fused with the self-attention mechanism comprises the following specific steps:

S14-1-1: figuring out an attention weight and an attention value term of each word according to the integrated multi-modal feature of each word In this embodiment, the attention weight and attention value term of each word are calculated as follows:

$$q_t = W_q x_t$$
$$k_t = W_k x_t$$
$$v_t = W_v x_t$$
$$\alpha_t = \text{softmax}\left(\frac{q_t^T k_t}{\sqrt{d}}\right)$$

Wherein, $q_t$ is an attention query term, $k_t$ is a key term, $v_t$ is the attention value term, $\alpha_t$ is the attention weight, $W_q$, $W_k$, and $W_v$ are linear variation parameters, $q_t^T$ is a transposition of $q_t$, d is the dimension of a vector, and softmax is a function.

S14-1-2: obtaining the multi-modal feature fused with the self-attention mechanism by calculation according to the attention weight and the attention value term of each word.

In this embodiment, obtaining the multi-modal feature fused with the self-attention mechanism by calculation according to the attention weight and the attention value term of each word comprises:

$$s_t = \sum_t \alpha_t v_t$$

Wherein, $s_t$ is the multi-modal feature fused with the self-attention mechanism of each word, and $$\sum_t$$

is a weight calculation symbol.

S14-2: inputting the multi-modal feature fused with the self-attention mechanism to a forward LSTM network and a backward LSTM network respectively to obtain a hidden-layer feature output by the forward LSTM network and a hidden-layer feature output by the backward LSTM network.

In this embodiment, the bidirectional LSTM and LSTM networks may take the mutual influence of the words into full consideration to capture the long-term dependence of the words. The features may be expressed as:

$$\overrightarrow{h_t} = \text{LSTM}_f(s_t, \overrightarrow{h_{t-1}}, \overrightarrow{c_{t-1}})$$
$$\overleftarrow{h_t} = \text{LSTM}_b(s_t, \overleftarrow{h_{t-1}}, \overleftarrow{c_{t-1}})$$

Wherein, $\overrightarrow{h_t}$ represents a forward feature, $\overleftarrow{h_t}$ represents a backward feature, $\text{LSTM}_f()$ represents forward network calculation, $\text{LSTM}_b()$ represents backward network calculation, $\overrightarrow{h_{t-1}}$ represents the feature of a previous word, $\overrightarrow{c_{t-1}}$ represents a previous memory unit, $\overleftarrow{h_{t-1}}$ represents the feature of a later word, and $\overleftarrow{c_{t-1}}$ represents a later memory unit.

S14-3: stitching the hidden-layer feature output by the forward LSTM network and the hidden-layer feature output by the backward LSTM network to obtain the final feature of each word.

In this embodiment, the final feature obtained by stitching the hidden-layer feature output by the forward LSTM network and the hidden-layer feature output by the backward LSTM network may be expressed as:

$$h_t = [\overrightarrow{h_t}, \overleftarrow{h_t}]$$

Wherein, $h_t$ represents the final feature of each word.

S15: obtaining a lie classification result according to the final feature of each word.

In this embodiment, obtaining a lie classification result according to the final feature of each word comprises the following specific steps:

S15-1: inputting the final feature of each word to a pooling layer, and obtaining global features by max-pooling.

In this embodiment, the final feature of each word is a final feature vector corresponding to each word, these feature vectors are input to the pooling layer, the global features of all words in the input clip may be obtained by max-pooling and are overall features of the words in the input clip, and whether each word in the input clip is true may be determined by comparing the features of true words and lies learned by the neural networks with the global features.

Illustratively, clips marked with true words and lies are used as a training set to train a lie detection network to obtain a trained lie detection network to recognize lies in the input clip. When the lie detection network is trained, whether each word spoken by each character in the clips input for training is true is marked, and then the lie detection network can learn video, audio and text features of true words and lies spoken by the characters. After the lie detection network is trained, the video, audio and text of the to-be-detected clip are input to the lie detection network, then the lie detection network extracts the global features of each word in the to-be-detected clip through the above steps, and whether each word in the input clip is true may be determined by comparing the features of true words and lies with the global features of each word.

S15-2: inputting the global features to a fully-connected network, and outputting the lie classification result by the fully-connected network.

In this embodiment, the fully-connected network functions as a classifier, each word in the input clip is classified according to the global features, and the classification result, which indicates whether the word is true, is output after classification, so that a lie detection task is completed.

Figure 2:
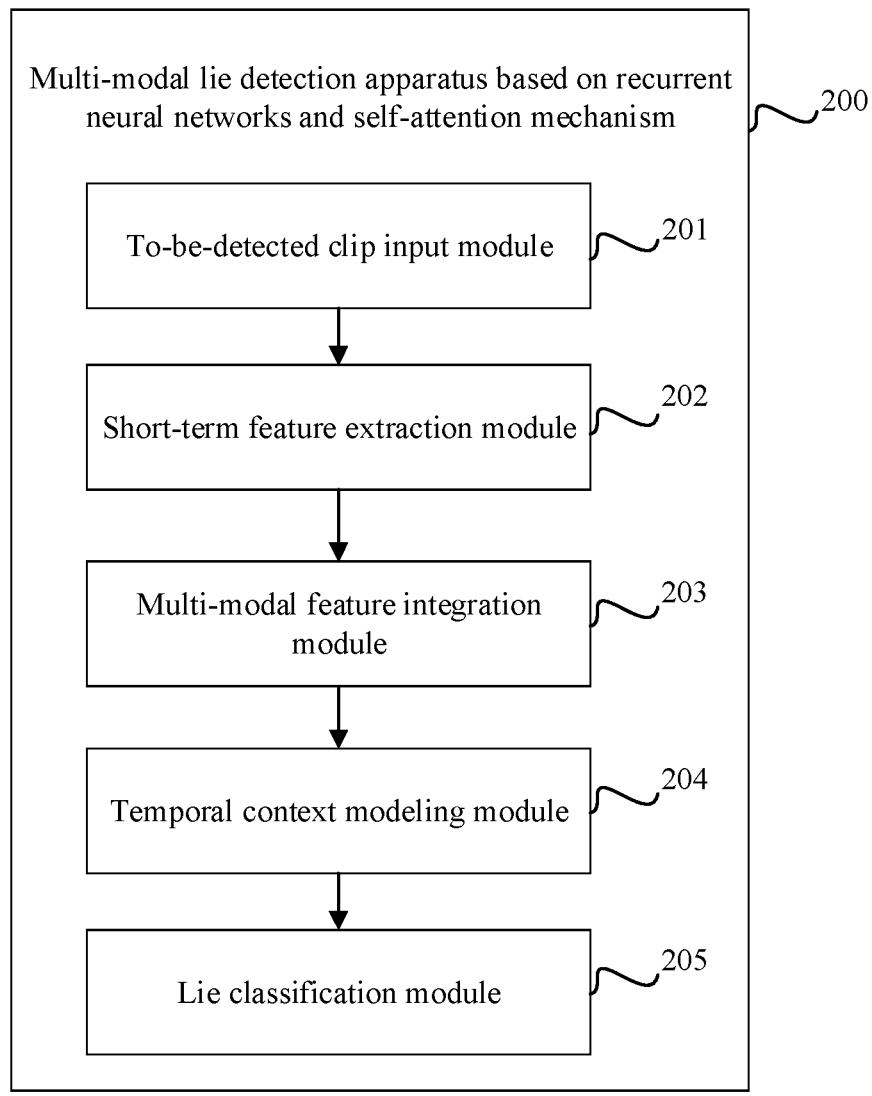
FIG. 2 is a schematic diagram of a multi-modal lie detection apparatus provided by one embodiment of the application.

Based on the same inventive concept, one embodiment of the application provides a multi-modal lie detection apparatus 200. Refer to FIG. 2 which is a schematic diagram of the multi-modal lie detection apparatus provided by one embodiment of the application. As shown, the multi-modal lie detection apparatus based on recurrent neural networks and a self-attention mechanism comprises:

a to-be-detected clip input module 201 used for inputting a to-be-detected audio, a to-be-detected video and a to-be-detected text, wherein the to-be-detected audio, the to-be-detected video and the to-be-detected text are three different modalities;

a short-term feature extraction module 202 used for performing feature extraction on the to-be-detected audio, the to-be-detected video and the to-be-detected text to obtain word-level deep audio features, word-level deep video features and word-level deep text features;

a multi-modal feature integration module 203 used for explicitly depicting first-order, second-order and third-order interactive relationships of the word-level deep audio features, the word-level deep video features and the word-level deep text features to obtain an integrated multi-modal feature of each word;

a temporal context modeling module 204 used for performing context modeling on the integrated multi-modal feature of each word to obtain a final feature of each word; and a lie classification module 205 used for obtaining a lie classification result according to the final feature of each word.

Optionally, the short-term feature extraction module comprises:

a text alignment sub-module used for acquiring alignment information of each word in the to-be-detected audio, the to-be-detected video and the to-be-detected text by a text alignment tool;

an audio feature extraction sub-module used for extracting the word-level deep audio features from the to-be-detected audio by a pre-trained audio feature extraction network according to the alignment information;

a video feature extraction sub-module used for extracting the word-level deep video features from the to-be-detected video by a pre-trained video feature extraction network according to the alignment information; and a text feature extraction sub-module used for inputting the to-be-detected text to a pre-trained text feature extraction network to extract the word-level deep text features from the to-be-detected text.

Optionally, the audio feature extraction sub-module comprises:

an audio clip extraction sub-module used for extracting an audio clip, corresponding to each word, from the to-be-detected audio according to the alignment information; and a deep audio feature extraction sub-module used for inputting the audio clip to the pre-trained audio feature extraction network to obtain the word-level deep audio features.

Optionally, video feature extraction sub-module comprises:

a video clip extraction sub-module used for extracting a video clip, corresponding to each word, from the to-be-detected video according to the alignment information;

an image extraction sub-module used for extracting multiple frames of images from the video clip;

an image down-sampling sub-module used for performing down-sampling on the multiple frames of images to obtain multiple down-sampled images;

a high-level feature extraction sub-module used for inputting the multiple down-sampled images to a trained image feature extraction network to extract high-level features from the multiple down-sampled images; and a deep video feature extraction sub-module used for pooling the high-level features to obtain pooled features, and taking the pooled features as the word-level deep video features of the video clip.

Optionally, multi-modal feature integration module comprises:

a deep feature uniformizing sub-module used for performing linear transformation on the word-level deep audio features, the word-level deep video features and the word-level deep text features respectively to uniformize dimensions of the features of the different modalities to obtain uniformized word-level audio features, word-level video features and word-level text features;

an element adding sub-module used for adding an element, the value of which is 1, to the uniformized word-level audio features, word-level video features and word-level text features respectively to obtain word-level audio features, word-level video features and word-level text features added with the element; and a multi-modal feature integration sub-module used for calculating a tensor product of the word-level audio features, word-level video features and word-level text features added with the element to obtain the integrated multi-modal feature of each word.

Optionally, the temporal context modeling module comprises:

a self-attention mechanism fusion sub-module used for calculating, by a self-attention mechanism, the integrated multi-modal feature of each word to obtain a multi-modal feature fused with the self-attention mechanism;

a hidden-layer feature extraction sub-module used for inputting the multi-modal feature fused with the self-attention mechanism to a forward LSTM network and a backward LSTM network respectively to obtain a hidden-layer feature output by the forward LSTM network and a hidden-layer feature output by the backward LSTM network; and a final feature stitching sub-module used for stitching the hidden-layer feature output by the forward LSTM network and the hidden-layer feature output by the backward LSTM network to obtain the final feature of each word.

Optionally, the self-attention mechanism fusion sub-module comprises:

a parameter calculation sub-module used for figuring out an attention weight and an attention value term of each word according to the integrated multi-modal feature of each word; and an attention mechanism calculation sub-module used for obtaining the multi-modal feature fused with the self-attention mechanism by calculation according to the attention weight and the attention value term of each word.

Optionally, the lie classification module comprises:

a pooling sub-module used for inputting the final feature of each word to a pooling layer to obtain global features by max-pooling; and a lie classification sub-module used for inputting the global features to a fully-connected network and outputting the lie classification result by the fully-connected network.

Based on the same inventive concept, another embodiment of the application provides an electronic device, comprising a memory, a processor, and a computer program stored in the memory and capable of running on the processor, wherein when the processor executes the computer program, the steps of the multi-modal lie detection method based on recurrent neural networks and a self-attention mechanism in any one above-mentioned embodiment of the application are performed.

The embodiment of the apparatus is basically identical with the embodiment of the method, and thus is briefly described, and relevant contents may be understood with reference to the description of the embodiment of the method.

The embodiments in this specification are described progressively, the differences from other embodiments are emphatically stated in each embodiment, and the similarities of these embodiments may be cross-referenced.

Those skilled in the art would appreciate that the embodiments of the application can be provided as a method, an apparatus or a computer program product. So, the embodiments of the application may be completely hardware embodiments, completely software embodiments, or embodiments combining software and hardware. In addition, the embodiments of the application may be in the form of a computer program product to be implemented on one or more computer-available storage media (including, but not limited to, a disk memory, a CD-ROM, an optical memory, and the like) comprising computer-available program codes.

The embodiments of the application are described with reference to the flow diagram and/or block diagram of the method, terminal device (system) and computer program product provided by the embodiments of the application. It should be understood that each process and/or block in the flow diagram and/or block diagram and the combinations of processes and/or blocks in the flow diagram and/or block diagram can be implemented by computer program instructions. These computer program instructions can be configured in a general-purpose computer, a special-purpose computer, an embedded processor, or a processor of other programmable data processing terminals to create a machine, so that the instructions can be executed by the computer or the processor of other programmable data processing terminals to create an apparatus for realizing specific functions in one or more processes in the flow diagram and/or in one or more blocks in the block diagram.

These computer program instructions may also be stored in a computer-readable memory that can guide the computer or other program data processing terminals to work in a specific manner, so that the instructions stored in the computer-readable memory can create a product including an instruction apparatus, and the instruction apparatus implements specific functions in one or more processes of the flow diagram and/or one or more blocks in the block diagram.

These computer program instructions may also be loaded on a computer or other programmable data processing terminal devices, so that the computer or other programmable terminal devices can perform a series of operation steps to carry out processing realized by the computer, and the instructions are executed on the computer or other programmable terminal devices to realize specific functions in one or more processes in the flow diagram and/or one or more block diagrams in the block diagram.

Although the preferred embodiments of the application have been described above, those skilled in the art who have known the basic creative concept of the application can make different alterations and modifications to these embodiments. So, the appended claims are intended to include the preferred embodiments and all alterations and modifications made within the scope of the embodiments of the application.

Finally, it should be noted that relational terms such as "first" and "second" in this specification are merely used to distinguish one entity or operation from the other one, and do not definitely indicate or imply that these entities or operations have any actual relations or sequences. In addition, the term "comprise" or "include" or other variations are intended to refer to non-exclusive inclusion, so that a process, method, article or terminal device comprising a series of elements not only comprises these elements listed, but also comprises other elements that are not clearly listed, or inherent elements of the process, method, article or terminal device. Unless otherwise clearly specified, an element defined by the expression "comprise a" shall not exclusive of other identical elements in a process, method, article or terminal device comprising said element.

The multi-modal lie detection method and apparatus and the device provided by the application are introduced in detail above, specific examples are used in this specification to expound the principle and implementation of the application, and the description of the above embodiments is merely used to assist those skilled in the art in understanding the method and core concept thereof of the application. In addition, those ordinarily skilled in the art can make changes to the specific implementation and application scope based on the concept of the application. So, the contents of the specification should not be construed as limitations of the application.

What is claimed is:

1. A multi-modal lie detection method, wherein the method comprises:
   inputting a to-be-detected audio, a to-be-detected video and a to-be-detected text, wherein the to-be-detected audio, the to-be-detected video and the to-be-detected text are three different modalities;
   performing feature extraction on the to-be-detected audio, the to-be-detected video and the to-be-detected text to obtain word-level deep audio features, word-level deep video features and word-level deep text features;
   explicitly depicting first-order, second-order and third-order interactive relationships of the word-level deep audio features, the word-level deep video features and the word-level deep text features to obtain an integrated multi-modal feature of each word;
   performing context modeling on the integrated multi-modal feature of each word to obtain a final feature of each word; and
   obtaining a lie classification result according to the final feature of each word;
   wherein performing context modeling on the integrated multi-modal feature of each word to obtain a final feature of each word comprises:
   calculating, by a self-attention mechanism, the integrated multi-modal feature of each word to obtain a multi-modal feature fused with the self-attention mechanism;
   inputting the multi-modal feature fused with the self-attention mechanism to a forward LSTM network and a backward LSTM network respectively to obtain a hidden-layer feature output by the forward LSTM network and a hidden-layer feature output by the backward LSTM network; and
   stitching the hidden-layer feature output by the forward LSTM network and the hidden-layer feature output by the backward LSTM network to obtain the final feature of each word.

2. The method according to claim 1, wherein performing feature extraction on the to-be-detected audio, the to-be-detected video and the to-be-detected text to obtain word-level deep audio features, word-level deep video features and word-level deep text features comprises:
   acquiring, by a text alignment tool, alignment information of each word in the to-be-detected audio, the to-be-detected video and the to-be-detected text;
   extracting the word-level deep audio features from the to-be-detected audio by a pre-trained audio feature extraction network according to the alignment information;
   extracting the word-level deep video features from the to-be-detected video by a pre-trained video feature extraction network according to the alignment information; and
   inputting the to-be-detected text to a pre-trained text feature extraction network to extract the word-level deep text features from the to-be-detected text.

3. The method according to claim 2, wherein extracting the word-level deep audio features from the to-be-detected audio by a pre-trained audio feature extraction network according to the alignment information comprises:

extracting an audio clip, corresponding to each word, from the to-be-detected audio according to the alignment information; and inputting the audio chip to the pre-trained audio feature extraction network to obtain the word-level deep audio features.

4. The method according to claim 2, wherein extracting the word-level deep video features from the to-be-detected video by a pre-trained video feature extraction network according to the alignment information comprises:

extracting a video clip, corresponding to each word, from the to-be-detected video according to the alignment information;

extracting multiple frames of images from the video clip;

performing down-sampling on the multiple frames of images to obtain multiple down-sampled images;

inputting the multiple down-sampled images to a trained image feature extraction network to extract high-level features from the multiple down-sampled images; and pooling the high-level features to obtain pooled features, and taking the pooled features as the word-level deep video features of the video clip.

5. The method according to claim 1, wherein explicitly depicting first-order, second-order and third-order interactive relationships of the word-level deep audio features, the word-level deep video features and the word-level deep text features to obtain an integrated multi-modal feature of each word comprises:

performing linear transformation on the word-level deep audio features, the word-level deep video features and the word-level deep text features respectively to uniformize dimensions of the features of the different modalities to obtain uniformized word-level deep audio features, word-level deep video features and word-level deep text features;

adding an element, the value of which is 1, to the uniformized word-level deep audio features, word-level deep video features and word-level deep text features respectively to obtain word-level audio features, word-level video features and word-level text features added with the element; and calculating a tensor product of the word-level audio features, word-level video features and word-level text features added with the element to obtain the integrated multi-modal feature of each word.

6. The method according to claim 1, wherein calculating, by a self-attention mechanism, the integrated multi-modal feature of each word to obtain a multi-modal feature fused with the self-attention mechanism comprises:

figuring out an attention weight and an attention value term of each word according to the integrated multi-modal feature of each word; and obtaining the multi-modal feature fused with the self-attention mechanism by calculation according to the attention weight and the attention value term of each word.

7. The method according to claim 1, wherein obtaining a lie classification result according to the final feature of each word comprises:

inputting the final feature of each word to a pooling layer, and obtaining global features by max-pooling; and inputting the global features to a fully-connected network, and outputting the lie classification result by the fully-connected network.

8. An electronic device, comprising a memory, a processor, and a computer program stored in the memory and capable of running on the processor, wherein when the processor executes the computer program, the steps of the method according to claim 1 are performed.

* * * * *